United States Patent
Schwarz et al.

(10) Patent No.: US 12,294,239 B2
(45) Date of Patent: May 6, 2025

(54) PLANAR DRIVE SYSTEM AND A METHOD FOR INSTALLATION AND REMOVAL OF STATOR MODULES

(71) Applicant: Syntegon Technology GmbH, Waiblingen (DE)

(72) Inventors: Sebastian Schwarz, Neusitz (DE); Marcus Kleinert, Wallhausen (DE)

(73) Assignee: Syntegon Technology GmbH, Waiblingen (DE)

( * ) Notice: Subject to any disclaimer, the term of this patent is extended or adjusted under 35 U.S.C. 154(b) by 275 days.

(21) Appl. No.: 18/295,072

(22) Filed: Apr. 3, 2023

(65) Prior Publication Data

US 2023/0318365 A1 Oct. 5, 2023

(30) Foreign Application Priority Data

Apr. 5, 2022 (DE) .................... 10 2022 108 188.5

(51) Int. Cl.
*H02K 1/12* (2006.01)
*H02K 16/00* (2006.01)
*H02K 41/02* (2006.01)

(52) U.S. Cl.
CPC ............... *H02K 1/12* (2013.01); *H02K 16/00* (2013.01); *H02K 41/02* (2013.01); *H02K 2213/12* (2013.01)

(58) Field of Classification Search
CPC .......... H02K 1/12; H02K 16/00; H02K 41/02; H02K 2213/12

(Continued)

(56) References Cited

U.S. PATENT DOCUMENTS 6,545,375 B2 4/2003 Hollis, Jr.
11,986,946 B2 * 5/2024 Zhang .................... B25H 3/026

(Continued)

FOREIGN PATENT DOCUMENTS

CA 2692956 C 11/2013
CA 3143896 A1 12/2020

(Continued)

OTHER PUBLICATIONS

German Patent Office Action for Related Application No. 10 2022 108 188.5 dated Jan. 17, 2023 (7 pages, including an English statement of relevance).

(Continued)

*Primary Examiner* — Rashad H Johnson
(74) *Attorney, Agent, or Firm* — Michael Best & Friedrich LLP

(57) ABSTRACT

A planar drive system (10) includes at least two stator modules (12) and a frame (14). Each of the stator modules (12) has a base body (16) with a transport surface (18) and a rear side (20) opposite the transport surface (18), and further a mounting plate (22) which is detachably mounted on the rear side (20) of the base body (16). The frame (14) includes a plurality of receptacles (24) for receiving a stator module (12), with the stator modules (12) insertable into the receptacles (24) of the frame (14) with the transport surface (18) forward and are lockable in the receptacle (24) by a locking mechanism (26). Also described is a method for the installation and removal of stator modules (12) in a planar drive system (10).

19 Claims, 10 Drawing Sheets

(58) Field of Classification Search
USPC ....................................................... 310/12.15
See application file for complete search history.

(56) References Cited

U.S. PATENT DOCUMENTS

| | | | |
|---|---|---|---|
| 12,045,071 B1 * | 7/2024 | King ...................... | H01R 24/78 |
| 12,127,352 B2 * | 10/2024 | McDonald ............... | H02G 3/14 |
| 12,176,694 B2 * | 12/2024 | Barr ................... | H01R 13/5825 |
| 12,206,202 B2 * | 1/2025 | Schwettmann ...... | H01R 13/506 |
| D1,059,829 S * | 2/2025 | Camp ........................... | D3/276 |
| 12,228,779 B2 * | 2/2025 | Coenegracht ........ | G02B 6/4452 |
| 12,231,076 B1 * | 2/2025 | Jasmin .................. | F24S 25/613 |
| 2020/0031594 A1 | 1/2020 | Ragan et al. | |
| 2025/0020272 A1 * | 1/2025 | Laganovskis ........ | H05K 5/0217 |

FOREIGN PATENT DOCUMENTS

| | | |
|---|---|---|
| CA | 3086617 C | 1/2021 |
| CN | 114142709 A | 3/2022 |
| DE | 4300197 A1 | 7/1994 |
| DE | 102008005779 A1 | 8/2009 |
| DE | 102014205819 A1 | 10/2015 |
| JP | 2015079908 A | 4/2015 |

OTHER PUBLICATIONS

European Patent Office Extended Search Report for Application No. 23164930 dated Aug. 23, 2023 (7 pages including statement of relevance).

* cited by examiner

PLANAR DRIVE SYSTEM AND A METHOD FOR INSTALLATION AND REMOVAL OF STATOR MODULES

BACKGROUND

The invention relates to a planar drive system and a method for the installation and removal of stator modules in a planar drive system.

In conventional planar drive systems, a movement surface for a mover of the planar drive system is constructed from a plurality of stator modules, which are generally aligned flush with one another. The stator modules each have a transport surface and are usually connected to a base plate on their rear side opposite the transport surface (usually screwed). To install/remove the stators, they are usually applied with their rear side applied to the base plate or removed therefrom. In this case, the stator modules are inserted and installed with their rear side forward.

Thus, for example, a stator module which is surrounded by further stator modules on all sides can be installed or removed only with a greater effort. The gripping of such a stator module must be accomplished, for example, with a suction cup on the transport surface, because the adjacent stator modules block lateral access. Alternatively, the adjacent stator modules may be removed to enable lateral access.

If, for example, a cover plate (for example for improving the surface properties) is attached to the stator module transport surfaces, the installation/removal of individual stator modules is more difficult. The cover plate must be removed during any installation work and reattached, because it blocks access from above (in the direction of the transport surface). Due to the often minimal thickness of the cover plate (possibly also film), non-destructive installation/removal is complicated.

For the installation/removal of stator modules, in some cases two persons are required (for example in the case of larger stator module surfaces for the stator modules situated in the center in vertical overhead operation), because the screw connection and the insertion of the stator module take place on two opposite sides of the base plate (insertion onto the base plate from above; screw connection to the base plate from below).

When an operator is working on the transport surface of the stator modules, moving movers represent a safety risk and must be switched off or removed beforehand. If a cover plate is present, it has to be removed beforehand and all movers arranged on the cover plate must be removed. The entire planar drive system must thus be deactivated and the stoppage of the machine occurs.

It is often the case that it is not permitted to walk on the transport surface of the stator modules. Therefore, in particular in the case of larger planar drive systems, the internal stators may only be reached by means of a crane or the like.

In pharmaceutical applications, the installation/removal of a stator module leads to complicated cleaning and sterilization processes, because it is necessary to enter the clean room in which the movers are arranged.

DE 43 00 197 A1, JP 2015-79 908 A and DE 10 2014 205 819 A1 each disclose a planar drive system.

It is therefore the object of the invention to provide a planar drive system and a method for the installation and removal of at least one stator module in a planar drive system, wherein the installation/removal of individual stator modules is optimized and the above disadvantages are eliminated.

SUMMARY

This object is achieved by a planar drive system according to the invention, wherein the planar drive system comprises at least two stator modules and one frame. Preferably, the planar drive system has a plurality of stator modules.

Each of the stator modules has a base body with a transport surface and a rear side opposite the transport surface. In the present case, the transport surface means the surface on which a mover moves. The transport surface is preferably designed as a planar (flat) surface. The transport surface can also be arranged under a cover plate during operation; it is the side of the stator module facing the mover.

Each of the stator modules further has a mounting plate which is detachably mounted on the rear side of the base body. The mounting plate can be mounted on the base body by means of screws and/or dowel pins, for example.

The frame comprises a plurality of receptacles. Each receptacle is configured to receive a stator module. The receptacles may have a rectangular or square shape. The receptacles may be arranged in the frame in a lattice-like manner, in particular in a checkerboard pattern, or form a lattice-like pattern, in particular a checkerboard-like pattern. The receptacles are thus in particular adjacent to one another in such a way that receptacles are arranged distributed over the entire surface of the frame and may be fitted with stator modules, in order to form a continuous surface on which the mover can be moved.

The stator modules may be inserted into the frames or their receptacles with the transport surface forward, in particular along an insertion direction, and can be locked in the receptacles by means of a locking mechanism or may be detachably connected to the frame.

Stator modules may be inserted into the frame or the receptacles thereof during operation of the planar drive system and/or removed from the frame or the receptacles thereof. The stator modules can be removed from the frame by releasing the locking mechanism and may thus be removed from the frame more or less "downward," i.e., in the direction facing away from the transport surface. During the removal and insertion of the stator modules, the planar drive system does not have to be faced by the transport surface, but instead, the stator modules can be inserted, locked, unlocked and removed from the opposite side, that is to say from the "underside."

The planar drive system can comprise at least one mover, in particular a plurality of movers, which can move along the transport surface of the stator modules (driven by the stator modules).

The stator modules may thus be securely installed and removed (for example for maintenance purposes) using simple means. Individual stator modules may be installed and removed separately. In this case, other stator modules, in particular adjacent stator modules, do not have to be included in the installation or removal process.

Individual stator modules may be installed and removed, for example during operation of the planar drive system. The stator modules may be installed here in the frame with their transport surface forward (in the insertion direction) and removed from the frame with their rear side forward (counter to the insertion direction). The stator modules may thus be installed and removed from below relative to the possibly present cover plate and movers (see below). Therefore, neither the movers nor the cover plate have to be removed in advance. This increases the accessibility of the stator modules and the maintenance friendliness of the planar drive system.

In the present case, the transport surface is arranged at the top and the rear side at the bottom on the base body.

The locking mechanism can comprise a plurality of pivotable elements which, in an inserted state of the respective stator module, can be pivoted into a closed position in which they each engage in a recess in the frame, in order to lock the stator module in the frame in a positive-locking manner. The recesses may be arranged in the receptacles (or their walls) of the frame.

The recess can be designed as an opening (e.g., hole or slot) in the frame. However, the recesses may also be depressions, which do not go through the material of the frame. The receptacles can be engaged behind by the locking mechanism, so that the stator modules can be fixed in a positive-locking manner.

The pivotable elements may be arranged on or in the mounting plate.

The pivotable elements may be designed as locking hooks or pivotable latches. A secure connection, which is in particular positive-locking along the insertion direction, can thus be realized in a simple manner.

The mounting plate can be detachably fastened to the base body, in particular to the rear side of the base body, by means of screws.

The base body can have a rectangular or square cross section.

In the closed position, the pivotable elements of the locking mechanism project from the base body or from the mounting plate.

By means of the locking mechanism or its pivotable elements, a positive-locking connection can be implemented, in particular along the insertion direction between the mounting plate or the stator module fastened thereto, and the frame. In particular, the stator module cannot be inserted into the frame when the locking mechanism is in the closed position. If the locking mechanism is in the closed position, the pivotable elements protrude from the mounting plate or from the base body, and prevent insertion of the stator module along the insertion direction into the frame. In the closed position, the pivotable elements are in particular pivoted out.

The base body can have four side surfaces, which are arranged orthogonally to the transport surface. Two adjacent side surfaces may be arranged (oriented) orthogonally to one another.

The frame can comprise a plurality of interconnected frame elements. The frame elements may be detachably connected to one another. It is conceivable that the frame can consist of frame elements. In the frame elements, recesses may be arranged, in which the pivotable elements of the locking mechanism may engage (in the closed position of the locking mechanism).

The receptacles of the frame may be composed of the frame elements. In other words, the frame elements may form the walls of the receptacles of the frame.

The frame elements may be arranged in a lattice-like manner, in particular in a checkerboard pattern. Different lattice structures of the frame may be implemented by the individual frame elements. The frame elements may be detachably connected to one another, in particular in a positive-locking manner. Individual frame elements may be removed or added to the frame.

The frame elements may be produced particularly favorably, for example, as laser blanks. If necessary, a friction-locking and/or integral connection between two interconnected frame elements can be supplemented.

The frame elements may be of different thicknesses (with different wall thicknesses) and have different lengths. A modular module can thus be created with which different frame structures or designs may be implemented.

In the inserted state, at least one side surface of each stator module can rest against the receptacle (contact the receptacle), in particular completely (with all side surfaces). It is also conceivable for only two or three sides of the stator module to rest against the receptacle (contact the receptacle).

The locking mechanism can be transferred into a release position. In the release position, insertion of the respective stator module into the frame or its receptacles can be made possible. In particular, the pivotable elements in the release position do not protrude from the mounting plate or from the base body of the stator module.

In the release position, the positive-locking connection between the closure mechanism and the recesses can be released in the frame or in the frame elements, in particular along the insertion direction. In the release position, the pivotable elements are in particular pivoted in.

The frame or the frame elements thereof can represent a partition wall between adjacent stator modules. In other words, adjacent stator modules do not rest against one another, but are, in particular, separated from one another by a frame element (in the inserted state of the stator modules). The resulting distance between two adjacent stator modules is dependent on the thickness of the respective frame element. If a mover moves over this distance, a loss of performance may result (positioning accuracy, permissible load, dynamics of the mover, etc.), because here, due to the distance (or absence of a stator module), no magnetic field or only an insufficient magnetic field can be generated. The wall thicknesses of the frame elements or of the frame are therefore usually kept low.

If stator module transitions having high performance requirements are required at certain locations in the planar drive system, the frame layout can be adapted. By replacing individual frame elements with lower thickness frame elements, the distance between adjacent stator modules can be minimized.

By removing individual frame elements or walls of the frame elements, the distance between adjacent stator modules can be eliminated. In this case, adjacent stator modules may rest against one another. In order to fasten these stator modules, in each case a different (larger) mounting plate can be used, which can compensate for the difference in size by a thinner or a missing frame element.

The planar drive system can further comprise at least one assembly module. The mounting plate can be detachably mounted on the assembly module. The module can be inserted into one of the receptacles of the frame and can be locked in the receptacle by means of the locking mechanism. Each receptacle can be configured to receive an assembly module.

The mounting plate can be mounted on the assembly module, for example by means of screws and/or dowel pins. During operation of the planar drive system, the assembly module can be inserted into the frame or the receptacles thereof and/or removed from the frame or the receptacles thereof. The assembly module can be, for example, a weighing cell, a fill level measuring cell or another process station.

The assembly module can correspond to a stator module in the form and size, so that the installation/removal of the assembly module can be implemented analogously to the installation/removal of a stator module.

The planar drive system can further comprise a cover plate which covers at least partially, in particular completely, the frame, the stator modules and/or the at least one assembly module. The cover plate covers, in particular, the frame, all the stator modules and all possibly present assembly modules. Movers which are magnetically driven by means of the stator modules arranged below the cover plate may be moved along (above) the cover plate. Since the stator modules and any assembly modules that may be present are inserted, for example for maintenance purposes, in the insertion direction and are removed counter to the insertion direction (i.e., from below), removal of the cover plate and of the movers is not necessary.

The planar drive system has in particular a sandwich-like structure, wherein the stator modules are arranged at the bottom and the movers are arranged at the top. The transport surface in the respective stator modules points upward in the direction of the mover. A cover plate can be arranged above the stator modules or the transport surfaces thereof and below the movers. In other words, the stator modules may be arranged below the cover plate with respect to the cover plate. Movers may be arranged above the cover plate. In relation to the movers, the cover plate can be arranged below the movers.

The cover plate can be fastened, in particular detachably, to the frame (or its receptacles, frame elements) at least at one point of attachment, in particular at a plurality of points of attachment. The point of attachment can be arranged on the frame (or the receptacles thereof, frame elements) between two adjacent stator modules.

The cover plate on the stator modules can bulge in the case of larger surfaces and "folds." This effect can occur because the plate is usually only fastened to the outer edges and may become unstable due to its usually small material thickness. However, the minimal distance between the cover plate and the movers moving above the cover plate requires a cover plate which has an (upper) surface that is as flat as possible.

Since the cover plate can be fastened to the frame (or frame elements, receptacles thereof) between the stator modules, a curvature of the cover plate or folding is prevented or at least reduced. As the points of attachment are multiplied, a curvature or folding can be further reduced. The attachment of the cover plate on the frame (or the frame elements, receptacles thereof) can be accomplished by all standard methods (positive-locking, friction-locking, and/or integrally).)

Power or signal lines may be integrated in the mounting plate. This enables a flatter structure of the planar drive system. A quick-change system can be realized. Plug-in processes of signal/power cables may be dispensed with. Assembly errors due to incorrectly wired signal lines may be avoided (polarity reversal protection, etc.).

The above object is further achieved by a method for installation and removal of stator modules in a planar drive system according to the invention.

The method comprises the steps of:
providing at least two stator modules, wherein each of the stator modules has a base body with a transport surface and a rear side opposite the transport surface;
providing a frame having a plurality of receptacles, wherein each receptacle is configured to receive a stator module;
inserting the stator modules with the transport surface forward into the receptacles of the frame;
locking the stator modules in the respective receptacles by means of a locking mechanism in each case.

In this way, the stator modules may be installed in the frame (or the receptacles thereof) and thus into the planar drive system.

The method may comprise the step of:
removing the stator modules from the receptacles of the frame with the rear side forward.

In this way, the stator modules may be removed from the frame (or the receptacles thereof) and thus from the planar drive system.

The planar drive system can be a planar drive system according to the above embodiments. With regard to the advantages that can be achieved thereby, reference is made to the statements relating in this respect to the planar drive system. The measures described in connection with the planar drive system and/or the measures explained below may serve for further configuration of the method.

BRIEF DESCRIPTION OF THE DRAWINGS

Further features, details and advantages of the invention emerge from the wording of the claims and from the following description of exemplary embodiments with reference to the drawings. In the drawings:

DETAILED DESCRIPTION

In the following description and in the figures, corresponding components and elements bear the same reference signs. For improved clarity, not all reference signs are reproduced in all figures.

Figure 1:
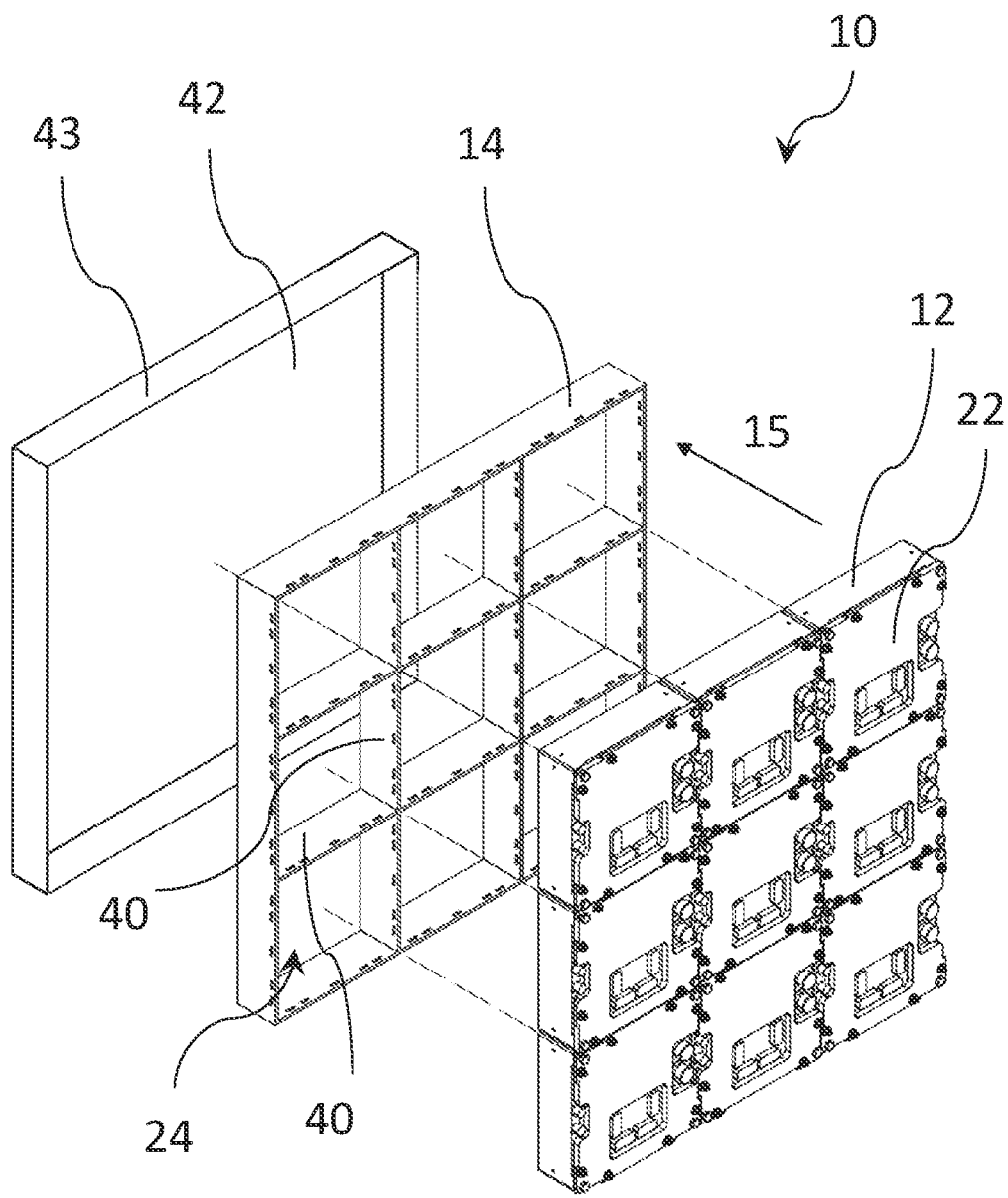
FIG. 1 shows an exploded view of a planar drive system.

FIG. 1 shows an exploded view of a planar drive system 10. In the present case, the planar drive system 10 comprises nine stator modules 12, a frame 14 and a cover plate 42.

In the present case, the frame 14 has nine receptacles 24, wherein each of the receptacles 24 is configured to each be able to receive a stator module 12.

In the present case, the frame 14 is constructed from a plurality of frame elements 40. The frame elements 40 also form the receptacles 24 arranged in a checkerboard pattern. The frame elements 40 represent the walls of the receptacles 24.

Figure 2:
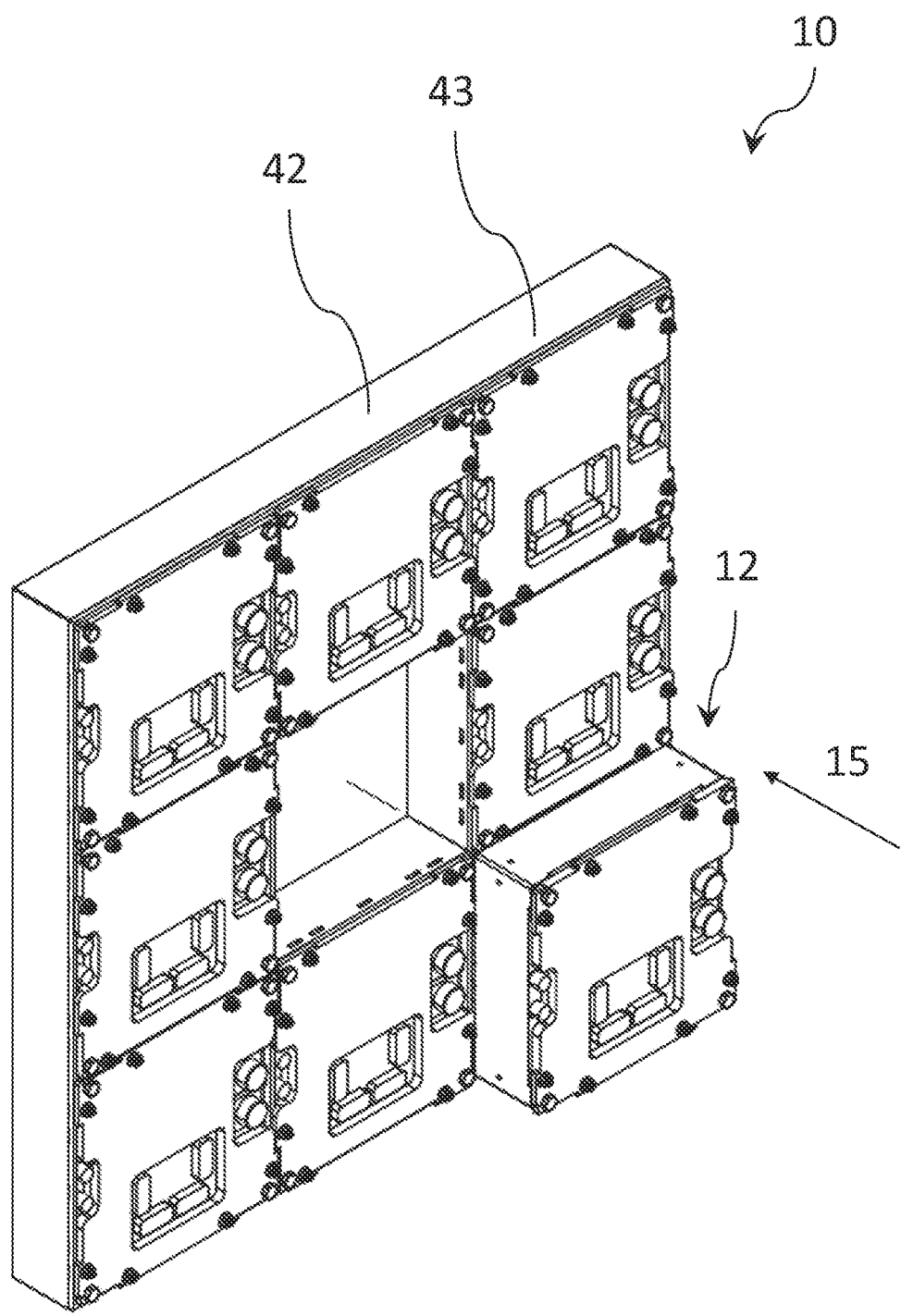
FIG. 2 shows the planar drive system according to FIG. 1 in a partially assembled state.

FIG. 2 shows the planar drive system 10 according to FIG. 1 in a partially assembled state. Eight of the nine stator modules 12 have been inserted into the respective receptacles 24 of the frame 14 along an insertion direction 15. The insertion direction 15 is marked in FIGS. 1 and 2 by means of an arrow.

The cover plate 42 in the present case has an edge 43. Thus, the cover plate 42 covers the frame 14 and the stator modules 12 received in the receptacles 24 of the frame 14 in the assembled state from above and laterally.

Figure 3:
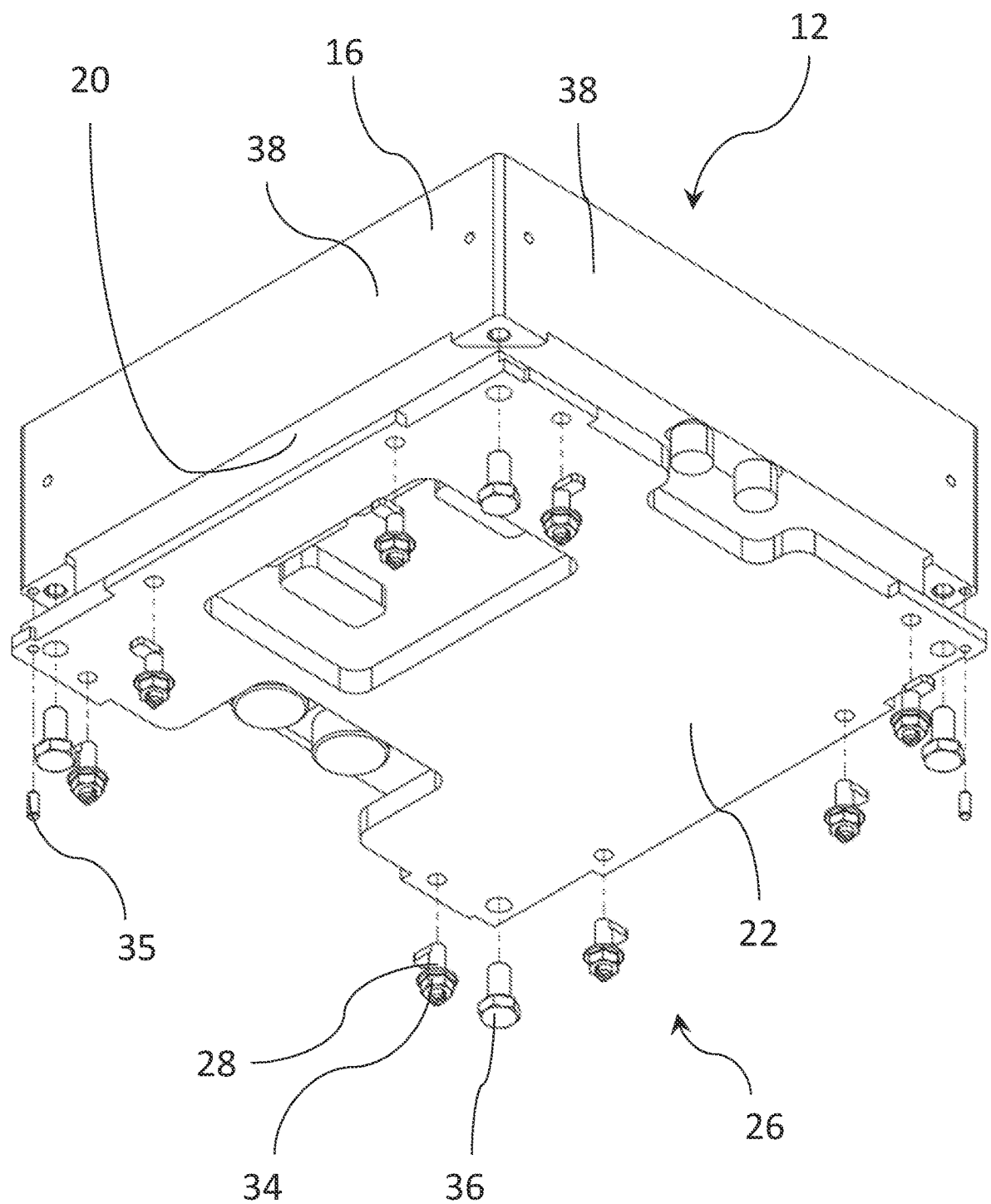
FIG. 3 shows an exploded view of a stator module, a mounting plate and a locking mechanism.
Figure 4:
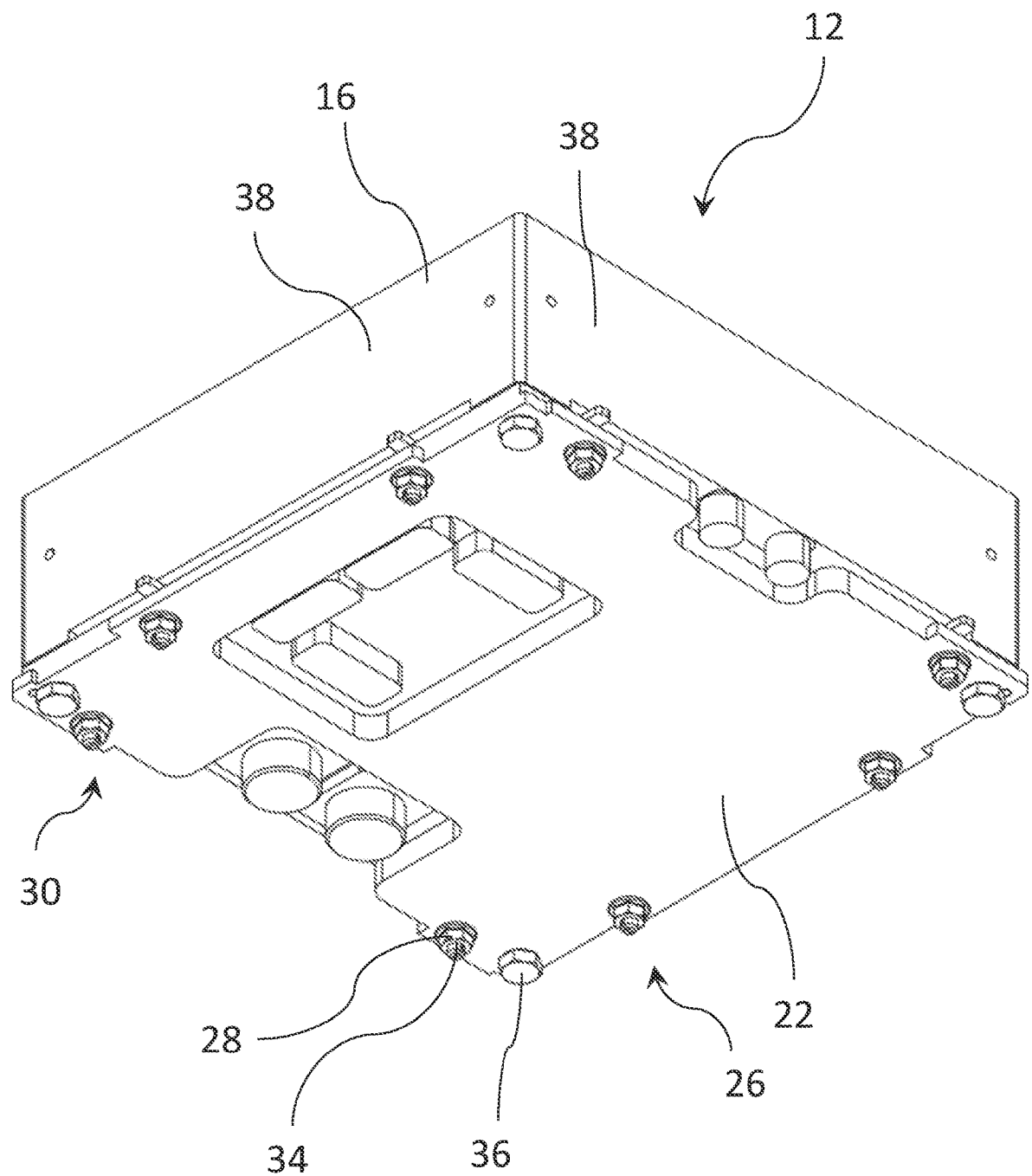
FIG. 4 shows the stator module, the mounting plate and the locking mechanism according to FIG. 3 in the assembled state.

FIG. 3 shows a stator module 12, a mounting plate 22 and a locking mechanism 26 in an exploded view, and FIG. 4 shows these components in the assembled state.

Figure 7:
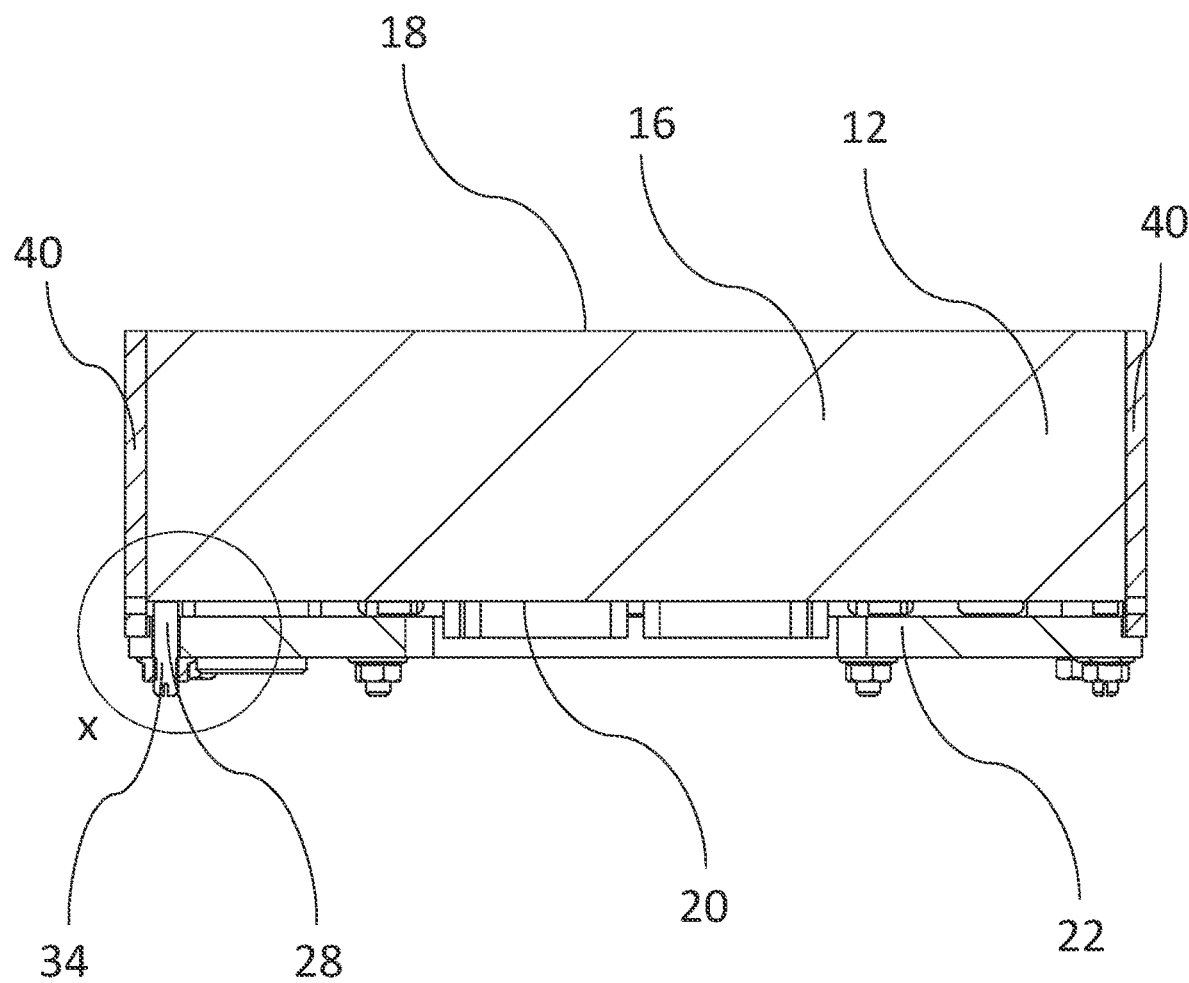
FIG. 7 shows a section A-A from FIG. 6, wherein the locking mechanism is in a release position.
Figure 9:
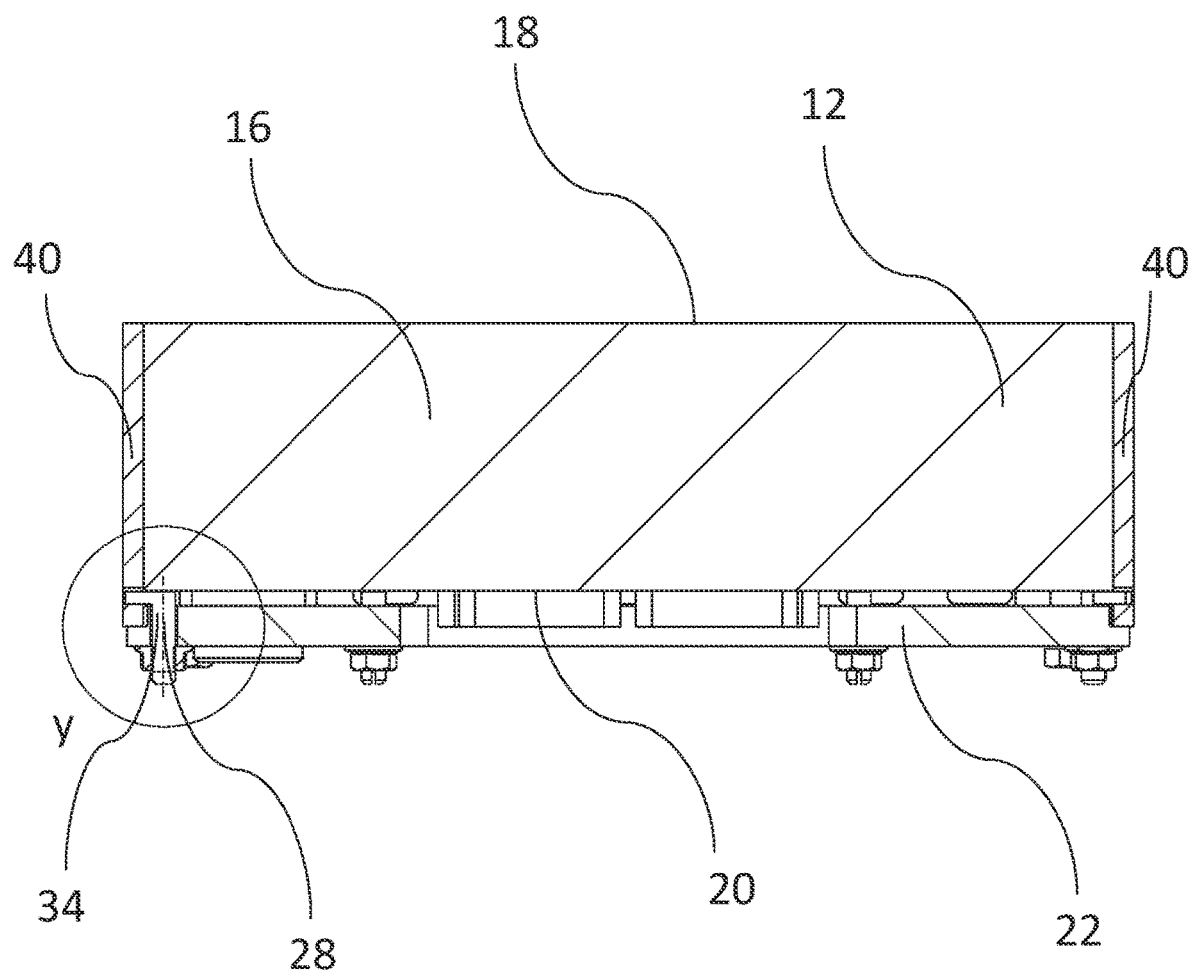
FIG. 9 shows a section A-A from FIG. 6, wherein the locking mechanism is in a closed position

The stator module 12 has a base body 16 with a transport surface 18 (cf. FIGS. 7 and 9). The base body 16 has a rear side 20 opposite the transport surface 18. The base body 16 has four side surfaces 38, which are arranged orthogonally to the transport surface.

A mounting plate 22 is mounted on the rear side 20 of the base body 16 and is screwed to the base body 16 by means of four screws 36. In the present case, two dowel pins 35 are inserted at two opposite corners of the mounting plate 22 and connect the mounting plate 22 to the base body 16 (or the rear side thereof 20).

In the present case, the locking mechanism 26 is arranged in the mounting plate 22. The locking mechanism 26 consists of eight pivotable elements 28, which in the present case are designed in the form of closure hooks 34. Two of the pivotable elements 28 are each arranged opposite one another on the mounting plate 22.

Figure 10:
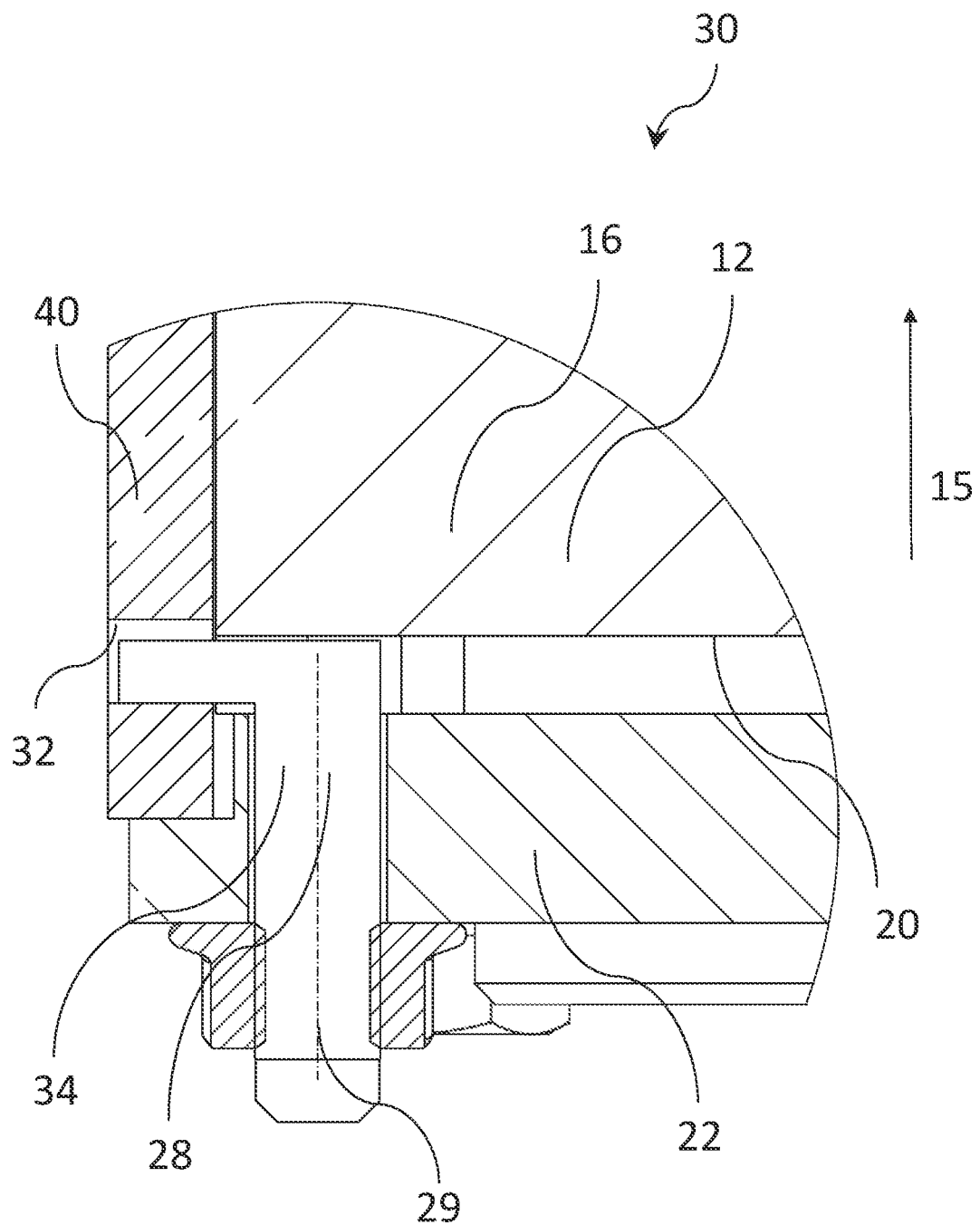
FIG. 10 shows a detail Y from FIG. 9.

The pivotable elements 28 are shown in the present case in a closed position 30 (cf. FIGS. 9 and 10). In the closed position 30, the pivotable elements 28 project from the mounting plate 22 or from the base body 16 of the stator module 12. In other words, the pivotable elements 28 are pivoted out in the closed position 30. In the closed position 30, the stator modules 12 fastened to the mounting plate 22 are locked within the receptacles 24.

Figure 5:
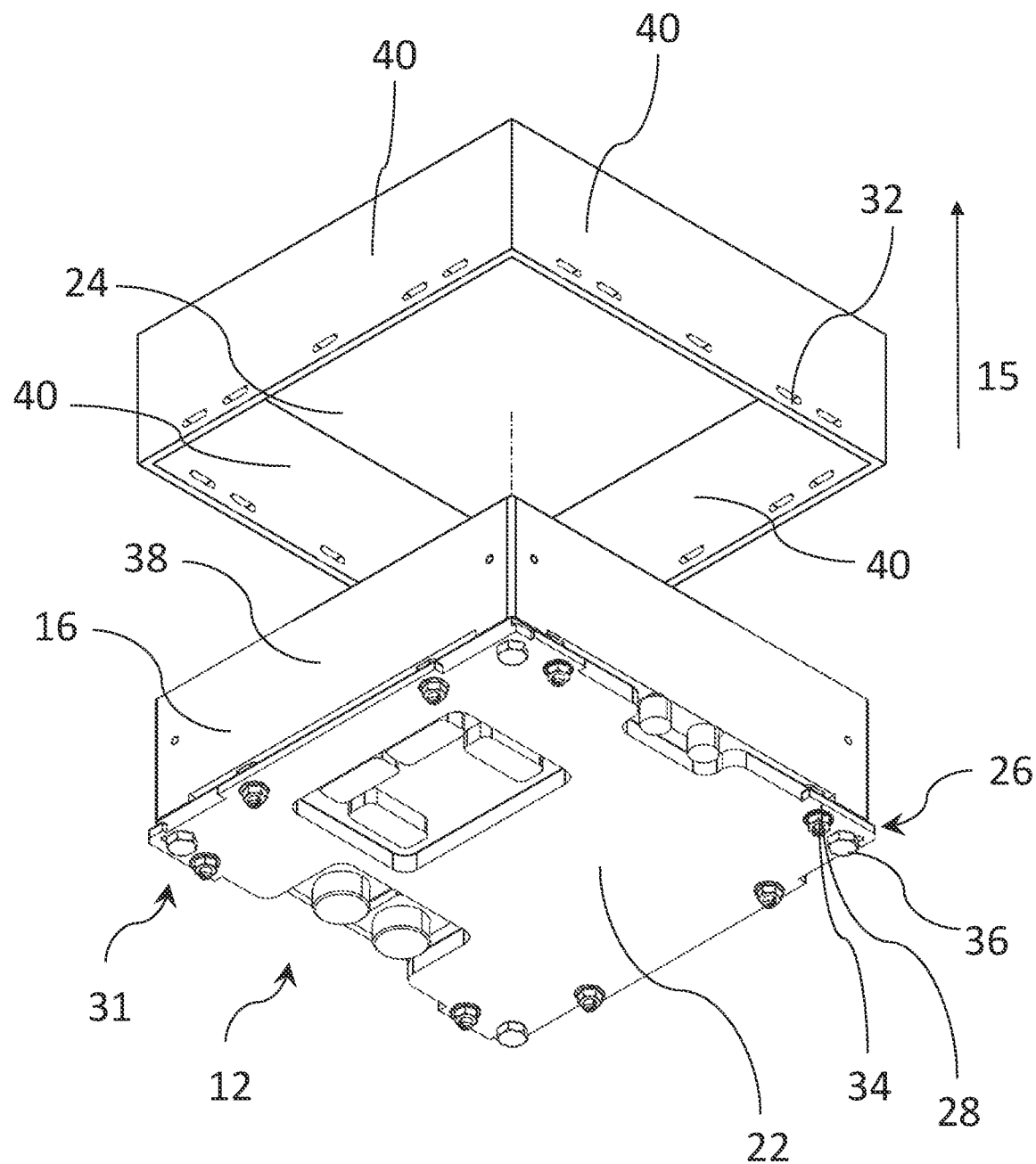
FIG. 5 shows a perspective view of a stator module and a receiving device.

FIG. 5 shows a perspective view of a stator module 12 and a receptacle 24. In the present case, four frame elements 40 form the receptacle 24. The frame elements 40 thus represent the walls of the square receptacle 24. The frame elements 40 have recesses 32, which in the present case are in the form of elongated holes.

For inserting the stator module 12 into the receptacle 24, the locking mechanism 26 is transferred into a release position 31, in which the pivotable elements 28 of the locking mechanism 26 are pivoted. In other words, the pivotable elements 28 no longer protrude from the mounting plate 22 or from the base body 16 of the stator module 12.

In the release position, the pivotable elements 28 of the locking mechanism 26 do not block the insertion of the stator module into the receptacle 24. The stator module 12 can thus be moved in the insertion direction 15 and can be inserted into the receptacle 24 with the transport surface 18 forward.

Figure 6:
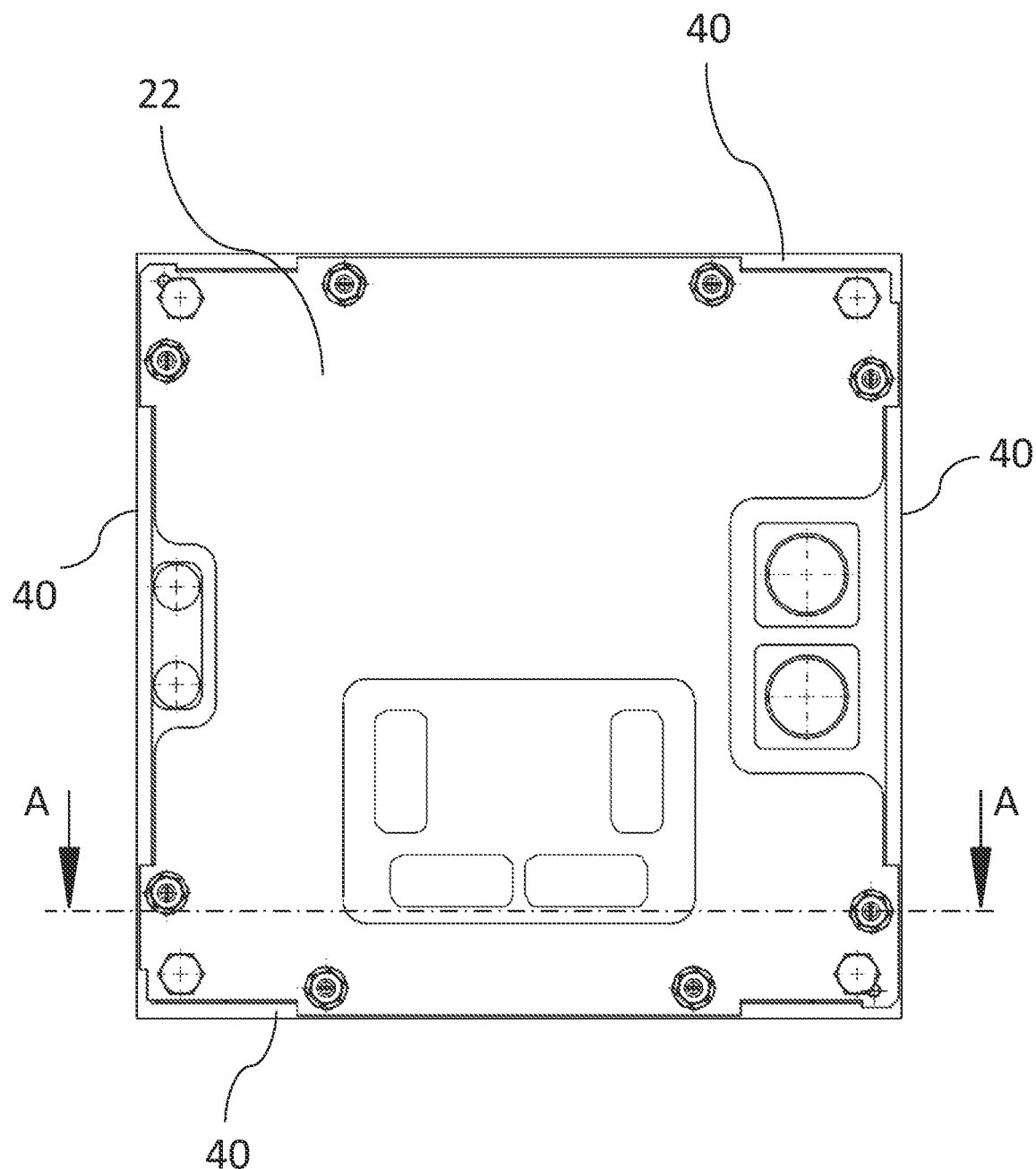
FIG. 6 shows a view from below of the stator module and the receptacle according to FIG. 5.

FIG. 6 shows a view from below of the stator module 12 and the receptacle 24 according to FIG. 5. A section A-A is marked by means of a dashed line.

Figure 8:
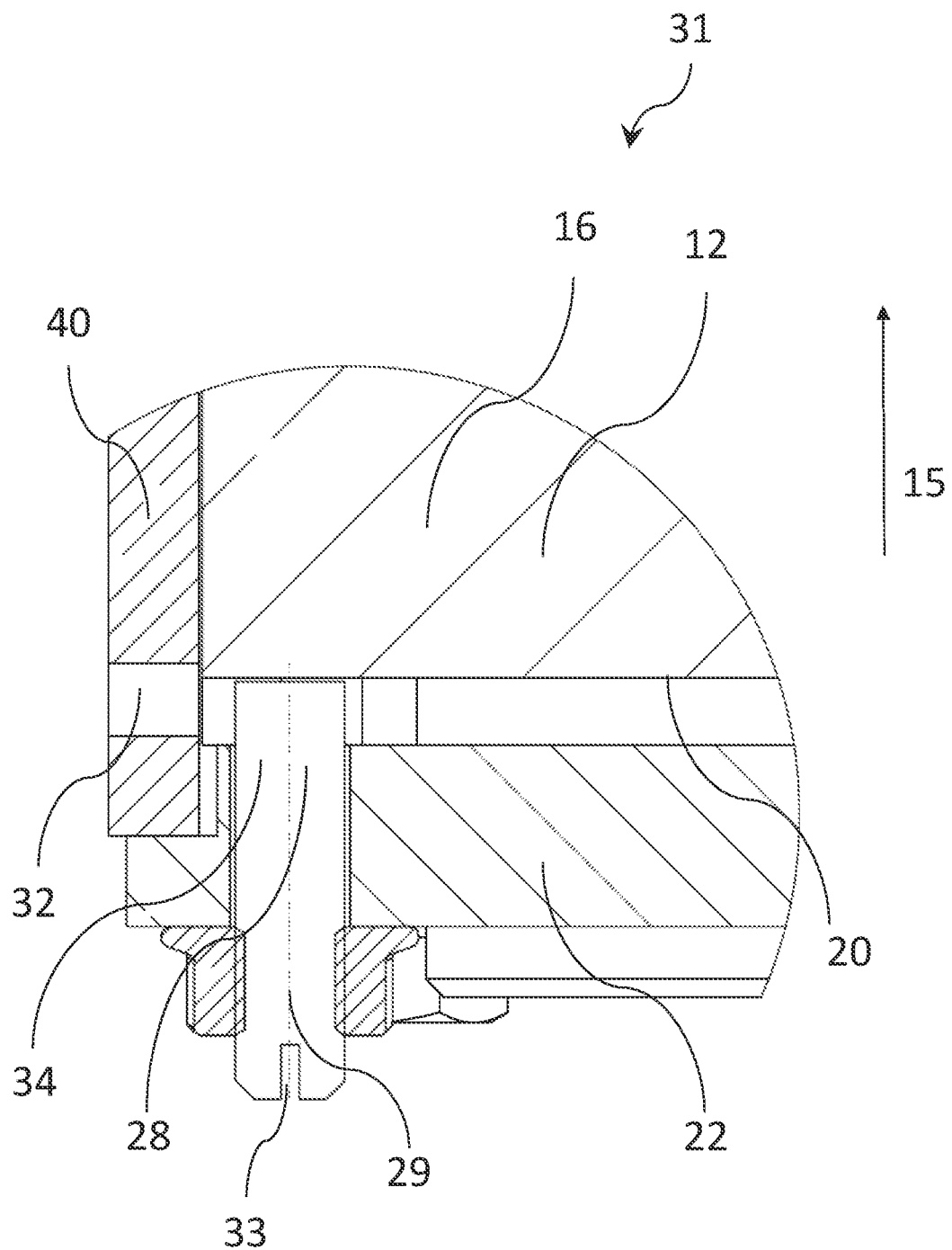
FIG. 8 shows a detail X from FIG. 7.

FIG. 7 shows a section A-A from FIG. 6, and FIG. 8 shows a detail X from FIG. 7.

In FIGS. 7 and 8, the stator module 12 including the mounting plate 22 and the locking mechanism 26 has been inserted into the receptacle 24, which is formed by the frame elements 40. The locking mechanism 26 is in the release position 31.

As can be seen particularly well from FIG. 8, the pivotable elements 28 of the locking mechanism 26 are pivoted into the release position 31 and do not engage in the recesses 32 of the frame elements 40. The stator module 12 is therefore inserted in the receptacle 24, but not yet locked in the receptacle 24. The stator module 12 can be moved back and forth along the insertion direction 15 as long as the locking mechanism 26 is in the release position 31.

FIG. 9 shows a section A-A from FIG. 6, and FIG. 10 shows a detail Y from FIG. 9.

In FIGS. 9 and 10, the stator module 12 including the mounting plate 22 and the locking mechanism 26 has been inserted into the receptacle 24, which has been formed by the frame elements 40. The locking mechanism 26 is in the closed position 30.

In the closed position 30, the pivotable elements 28 are pivoted out and engage in the recesses 32 of the frame elements 40. A positive-locking connection is produced in particular along the insertion direction 15. The stator module 12 is thus locked in the receptacle 24.

To remove the stator module, the pivotable elements 28 are pivoted in again. The locking mechanism 26 is thus transferred into the release position 31 (cf. FIG. 8). As soon as the locking device 26 is in the release position 31 and the friction locking between the pivotable elements 28 and the recesses 32 is canceled, the stator module 12 can be moved counter to the insertion direction 15 and removed from the receptacle 24 with the rear side 20 in front.

The pivotable elements 28 are pivotably accommodated along the pivot axes 29 thereof in the mounting plate 22 (cf. FIGS. 8 and 10). In the present case, the pivotable elements 28 have a slot 33 on their end facing away from the base body 16 of the stator module 12 (cf. FIG. 8). The pivotable elements 28 may thus be pivoted back and forth, for example by means of a flat-tip screwdriver, which engages in the slot 33 and is rotated. Accordingly, the locking mechanism 26 can in the present case be transferred from the release position 31 into the closed position 30 and vice versa by means of a flat-tip screwdriver.

The invention claimed is:

1. A planar drive system (10) comprising
at least two stator modules (12) and one frame (14),
wherein each of the stator modules (12) has a base body (16) with a transport surface (18) and a rear side (20) opposite the transport surface (18), and further a mounting plate (22) which is detachably mounted on the rear side (20) of the base body (16),
wherein the frame (14) comprises a plurality of receptacles (24), wherein each receptacle (24) is configured to receive a stator module (12),
wherein the stator modules (12) with the transport surface (18) can be inserted into the receptacles (24) of the frame (14) and can be locked in the receptacles (24) by a locking mechanism (26).

2. The planar drive system (10) according to claim 1, wherein the locking mechanism (26) comprises a plurality of pivotable elements (28) which, in an inserted state of the respective stator module (12), are pivotable into a closed position (30) in which they each engage in a recess (32) in the frame (14) in order to lock the stator module (12) in the frame (14) in a positive-locking manner.

3. The planar drive system (10) according to claim 2, wherein the pivotable elements (28) are arranged on the mounting plate (22).

4. The planar drive system (10) according to claim 2, wherein the pivotable elements (28) are configured as closure hooks (34).

5. The planar drive system (10) according to claim 1, wherein the mounting plate (22) is detachably fastened to the base body (16) by screws (36).

6. The planar drive system (10) according to claim 5, wherein the mounting plate (22) is detachably fastened to the rear side (20) of the base body (16).

7. The planar drive system (10) according to claim 1, wherein the base body (16) has a rectangular or square cross section.

8. The planar drive system (10) according to claim 1, wherein the base body (16) has four side surfaces (38) which are arranged orthogonally to the transport surface (18).

9. The planar drive system (10) according to claim 8, wherein, in the inserted state, at least one side surface (38) of each stator module (12) rests against the receptacle (24).

10. The planar drive system (10) according to claim 1, wherein the frame (14) comprises a plurality of frame elements (40) connected to one another.

11. The planar drive system (10) according to claim 10, wherein the frame elements (40) are detachably connected to one another.

12. The planar drive system (10) according to claim 1, wherein planar drive system (10) further comprises at least one assembly module, wherein the mounting plate (22) is detachably mounted on the assembly module, wherein the assembly module is insertable into one of the receptacles (24) of the frame (14) and is lockable in the receptacle (24) by the locking mechanism (26).

13. The planar drive system (10) according to claim 1, wherein the planar drive system (10) further comprises a cover plate (42) which covers at least partially, the frame (14), the stator modules (12) and/or the at least one assembly module.

14. The planar drive system (10) according to claim 13, wherein the cover plate (42) is fastened to the frame (14) at least at one point of attachment, wherein the point of attachment is arranged on the frame (14) or frame element (40) between two adjacent stator modules (12).

15. The planar drive system (10) according to claim 14, wherein the cover plate (42) is fastened to the frame (14) at a plurality of points of attachment.

16. The planar drive system (10) according to claim 13, wherein the cover plate (42) completely covers the frame (14), the stator modules (12) and/or the at least one assembly module.

17. The planar drive system (10) according to claim 1, wherein power or signal lines are integrated in the mounting plate (22).

18. A method for installation and removal of stator modules (12) in a planar drive system (10), comprising the steps of:
    providing at least two stator modules (12), wherein each of the stator modules (12) has a base body (16) with a transport surface (18) and a rear side (20) opposite the transport surface (18);
    providing a frame (14) with a plurality of receptacles (24), wherein each receptacle (24) is configured to receive a stator module (12);
    inserting the stator modules (12) with the transport surface (18) forward into the receptacles (24) of the frame;
    locking of the stator modules (12) in the respective receptacles (24) by a locking mechanism (26).

19. The method according to claim 18, wherein the method further comprises the step of:
    removal of the stator modules (12) from the receptacles (24) of the frame (14) with the rear side (20) forward.

* * * * *